US007658207B2

(12) United States Patent
Staudinger

(10) Patent No.: US 7,658,207 B2
(45) Date of Patent: Feb. 9, 2010

(54) HYDRAULIC PRESSURE RESERVOIR

(75) Inventor: Martin Staudinger, Ettlingen (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 457 days.

(21) Appl. No.: 11/474,743

(22) Filed: Jun. 26, 2006

(65) Prior Publication Data

US 2007/0028981 A1 Feb. 8, 2007

Related U.S. Application Data

(60) Provisional application No. 60/702,141, filed on Jul. 25, 2005.

(30) Foreign Application Priority Data

Jun. 29, 2005 (DE) ........................ 10 2005 030 187

(51) Int. Cl.
*F16L 55/04* (2006.01)

(52) U.S. Cl. .......................................... 138/31; 138/30

(58) Field of Classification Search ................... 138/30, 138/31
See application file for complete search history.

(56) References Cited

U.S. PATENT DOCUMENTS

| | | | | |
|---|---|---|---|---|
| 3,108,616 | A * | 10/1963 | Ray | 137/628 |
| 3,434,285 | A * | 3/1969 | Hager | 60/557 |
| 3,749,452 | A | 7/1973 | Deschenes | 303/22.7 |
| 4,164,954 | A | 8/1979 | Ballard | 137/116.3 |
| 4,312,382 | A * | 1/1982 | Gebauer | 138/30 |
| 5,070,983 | A | 12/1991 | Leigh-Monstevens et al. | 192/85 C |
| 6,712,021 | B2 * | 3/2004 | Pollock | 119/72 |
| 6,929,034 | B1 * | 8/2005 | Larsen et al. | 138/30 |
| 7,459,003 | B2 * | 12/2008 | Crockett et al. | 55/385.1 |
| 2008/0257439 | A1 * | 10/2008 | Staudinger et al. | 138/30 |

FOREIGN PATENT DOCUMENTS

| | | | |
|---|---|---|---|
| DE | 2 222 051 | A1 | 11/1972 |
| GB | 1127731 | | 9/1968 |
| GB | 2 348 259 | A | 9/2000 |
| WO | WO 2005/015019 | A1 | 2/2005 |

* cited by examiner

*Primary Examiner*—James F Hook
(74) *Attorney, Agent, or Firm*—Alfred J. Mangels

(57) ABSTRACT

An hydraulic pressure reservoir having at least one pressure chamber with a fluid connection to a hydraulic circuit. The pressure chamber is formed between a movable partition member carried in a housing and having a pressure limiting valve, and a fixed partition. The movable partition member is in the form of a diaphragm spring.

12 Claims, 2 Drawing Sheets

HYDRAULIC PRESSURE RESERVOIR

BACKGROUND OF THE INVENTION

1. Field of the Invention

The present invention relates to a hydraulic pressure reservoir having at least one pressure chamber with a fluid connection to a hydraulic circuit, and that is arranged between a movable partition positioned in a housing and a fixed partition, and that includes a pressure limiting valve.

2. Description of the Related Art

Hydraulic circuits are employed in many applications, for example to trigger control pulses or also to produce an actuating force by actuating a piston/cylinder unit.

An automatically operated clutch can be operated by means of a hydraulic actuator, for example, or such a hydraulic circuit can also be employed to adjust the transmission ratio between the two pairs of conical disks of a belt-driven conical-pulley transmission. When such an actuating force has to be built up very quickly, the start-up process of an electric motor of an electrically-powered hydraulic pump can result in the start-up time needed for the start-up process of the electric motor being too long. It is therefore necessary to hold a certain volume of pressure fluid in reserve at a predetermined pressure, so that the required actuating force can be built up in the required time with the pressure fluid.

Hydraulic pressure reservoirs in the form of a membrane reservoir, for example, can be employed to keep that volume of pressure fluid ready at the predetermined pressure level. The membrane reservoir, however, has the disadvantage that, on the one hand, the membrane is not completely pressure-tight, and, on the other hand, it is subject to fatigue effects, so that the life span required of the pressure reservoir cannot be met with the membrane reservoir.

A further possibility of such a pressure reservoir is a piston pressure tank with a helical spring, with which the desired quantity of pressure fluid can be stored at the predetermined pressure level. Such a piston pressure tank has a pressure piston that is axially movable in a cylinder, whereby the pressure fluid can be kept at the desired pressure level. However, as the pressure rises, the problems of the seal between the pressure piston and the cylinder wall also increase, so that it is necessary to produce the fit between the pressure piston and the cylinder with high precision, which results in high production costs. Furthermore, the piston pressure tanks require that tipping or tilting of the piston in the cylinder bore must be prevented, so that the piston must include a certain guide length in order to be able to seal well.

The same problem also arises with a piston pressure tank acting against gas pressure, where the helical spring has merely been replaced by a gas reservoir.

In that regard, an object of the present invention is to provide a hydraulic pressure reservoir that can be manufactured economically, that also eliminates the problem of the pressure chamber leaking, and, additionally, that has little wear after many load change cycles and thus is distinguished by a long life span.

SUMMARY OF THE INVENTION

To achieve that object, the present invention provides a hydraulic pressure reservoir having at least one pressure chamber in fluid connection with a hydraulic circuit. The pressure chamber is formed between a movable partition arranged in a housing and a fixed partition, and it includes a pressure limiting valve. The movable partition is in the form of a diaphragm spring.

Employing the diaphragm spring as the movable partition solves the problem of membrane leakage in a membrane pressure reservoir. The formation of a pressure piston with a certain length to avoid the problem of the piston tipping in a cylinder bore is also eliminated. Furthermore, the pressure reservoir equipped with the diaphragm spring is pressure-tight even when the fluid stored in the pressure chamber is at a very high pressure, because a configuration is possible in which the diaphragm spring is continuously pressed harder against the sealing elements as the internal pressure in the pressure chamber rises, or a configuration in which the sealing elements are pressed continuously harder against the diaphragm spring as the interior pressure rises. In that way a completely fluid-tight pressure chamber can be achieved, and also nothing changes structurally even after many load change cycles of the diaphragm spring, which serves as the movable partition of the pressure chamber.

In accordance with the invention, it is also possible for the diaphragm spring to include a diaphragm spring body in the form of a ring disk, with a center opening that is closed by means of an inner cover that closes the pressure chamber off from the outside. That configuration makes it possible to use a known diaphragm spring, where only its center opening has to be closed by the inner cover. An arrangement is possible in which the inner cover is pressed against the body of the diaphragm spring, with a sealing element interposed in the form of an elastomeric body, for example, so that a defined pressure force can be built up between the inner cover and the body of the diaphragm spring in the region of the sealing element.

In order to prevent an internal pressure that exceeds a predetermined pressure level in the pressure chamber, a pressure limiting valve that opens at a predetermined threshold pressure is provided in the pressure chamber, and in accordance with a further embodiment of the invention, it can be positioned in a throughbore in the inner cover.

In accordance with the invention, the fixed partition can be provided in the form of a control plate having predetermined passageways to provide a fluid connection of the pressure chamber with the hydraulic circuit, and for a flange ring to be affixed on a flange surface of the control plate to releasably fix the diaphragm spring. Pressure fluid can be delivered into the pressure chamber and released again through the predetermined passageways in the control plate, so that the pressure chamber has a fluid connection with the hydraulic circuit through the control plate. It is possible to achieve functional integration through the fact that the control plate has a flange surface on which a flange ring can be affixed for releasable affixing of the diaphragm spring. To assemble the hydraulic pressure reservoir in accordance with the invention, the diaphragm spring therefore merely needs to be inserted, for example, into a recess provided in the control plate and then to be held against the flange surface of the control plate by means of the flange ring, with a sealing element interposed that seals the pressure chamber off from the outside.

That arrangement also eliminates a problem that can be observed in pressure reservoirs, namely that as the internal pressure in the pressure chamber rises, a cover plate that closes off the pressure chamber from the outside becomes bowed toward the outside. The cover plate of the present invention is in the form of a flange ring, and the ring-disk-shaped diaphragm spring body that closes off the pressure chamber from the outside moves only slightly in relation to the fixed partition.

That relative movement of the ring-disk-shaped diaphragm spring body relative to the fixed partition also results in a radial motion component of the region of the diaphragm spring body that lies radially toward the outside, because of the taper angle of the diaphragm spring.

In order to prevent the region of the diaphragm spring that lies radially toward the outside, from producing a chip removing motion on the flange ring during that radial movement, the invention provides for the flange ring to include a U-shaped cross section on the side facing toward the pressure chamber, and for a wire ring to be located between the diaphragm spring and the U-shaped region, on which wire ring the region of the diaphragm spring that lies radially toward the outside can undergo a radial movement relative to the flange ring.

The wire ring ensures that the diaphragm spring is able to undergo a sliding movement on the wire ring at its contact region lying radially to the outside, and that the latter is able to roll by a small amount on its contact surface, i.e., the region of the flange ring with the U-shaped cross section. Thus, by interposing the wire ring, a transition of the contact surface of the diaphragm spring lying radially toward the outside from a state of static friction to a state of dynamic friction on the flange ring, which would result in a chip-removing motion on the flange ring and thus to premature wear, is avoided. The result is that the pressure reservoir in accordance with the invention experiences little wear, even after many load change cycles, and hence is distinguished by a very long life span.

In a similar way, a further embodiment of the invention provides that the inner cover at the region facing the diaphragm spring has a U-shaped cross section, and that a wire ring is positioned between the diaphragm spring and the U-shaped region, on which the region of the diaphragm spring lying radially toward the inside undergoes a radial movement relative to the inner cover. Here also, because of the wire ring, the problem of the wear of the inner cover and/or of the diaphragm spring body in the contact region between the diaphragm spring and the inner cover is avoided.

As previously mentioned, sealing elements are provided between the pressure chamber and the outside, which can be positioned between the inner cover and the diaphragm spring and between the diaphragm spring and the control plate. The sealing elements, for example in the form of ring-shaped elastomeric elements, are therefore pressed against the inner cover and the diaphragm spring, as well as the control plate, by the internal pressure in the pressure chamber, and close off the pressure chamber hermetically from the outside with a fluid-tight seal.

In accordance with a further embodiment of the invention, the pressure limiting valve previously described can include a valve body having a sealing surface facing and between the valve body and the inner cover, in particular a conical sealing surface, where the valve body can also include a throughbore to receive a shaft of a threaded bolt.

The outer thread of the threaded bolt can be engaged with an inner thread in the throughbore of the valve body, so that the threaded bolt extends from the valve body and can be retained by means of a lock nut having a threaded blind bore. The shaft of the threaded bolt includes a bolt head that can engage a shoulder provided in the control plate to limit bolt outward movement. The retention by the nut on the outer thread of the threaded bolt provides a sealing surface between the valve body and the nut, which prevents the uncontrolled escape of pressure fluid from the pressure chamber into the surroundings.

The threaded bolt described above can extend into a bore in the control plate, so that components of the pressure limiting valve are received in that bore. A further embodiment of the invention provides that a shoulder is formed in the bore, on which the head of the threaded bolt comes to rest in such a manner that if a predetermined threshold pressure in the pressure chamber is exceeded, the threaded bolt releases the contact of the valve body with the inner cover. Thereby an overrun of the threshold pressure within the pressure chamber is prevented, because the separation of the valve body from the inner cover as a result of the higher internal pressure allows pressure fluid to escape from the pressure chamber to the outside.

The omnidirectional pressure that exists in the pressure chamber results in a pressure force acting on the fixed partition that is in the form of the control plate. To balance that pressure force, and furthermore to increase the volume of available pressure fluid, the invention provides that the hydraulic pressure reservoir has two pressure chambers, where two pressure reservoirs—as described above—with fixed partitions or control plates are adjacent to each other and with only one connection to the hydraulic circuit, are connected in such a manner that the pressure forces exerted on the respective partitions cancel each other out at the partition contact plane. That means that two hydraulic pressure reservoirs coupled together into one unit are connected with each other in such a way that the two fixed partitions come to rest against each other, and thus the pressure forces that prevail at the partition contact plane cancel each other out in accordance with the superposition principle.

The fixed partitions identified above can be control plates having predetermined passageways. A further embodiment of the invention therefore provides for an intermediate plate to be placed between the fixed partitions, and which has bores to provide a fluid connection of predetermined passageways of the control plates, so that the pressure fluid in the two pressure chambers is connected with the hydraulic circuit through only one flange connection provided on a control plate, and the hydraulic fluid can reach both pressure chambers and can be released from them through that connection and the control plates, as well as the bores in the intermediate plate.

In accordance with a further embodiment of the invention, the control plates are connected by means of threaded bolts that pass through the flange surfaces and flange rings. Through that arrangement bending of the control plates caused by internal pressure is prevented. The result of the threaded bolts passing through both control plates is that the number of threaded bolts does not increase compared to a hydraulic pressure reservoir having only one pressure chamber, because both diaphragm springs and both flange rings can be clamped against the respective control plates with the threaded bolts. Furthermore, that arrangement has the advantage that the control plates are not subjected to any bending load because the bolts are not supported against them, and it is also not necessary to place any stress grooves and costly inner threads in the control plates.

BRIEF DESCRIPTION OF THE DRAWINGS

The structure, operation, and advantages of the present invention will become further apparent upon consideration of the following description, taken in conjunction with the accompanying drawings in that.

DESCRIPTION OF THE PREFERRED EMBODIMENTS

Figure 1:
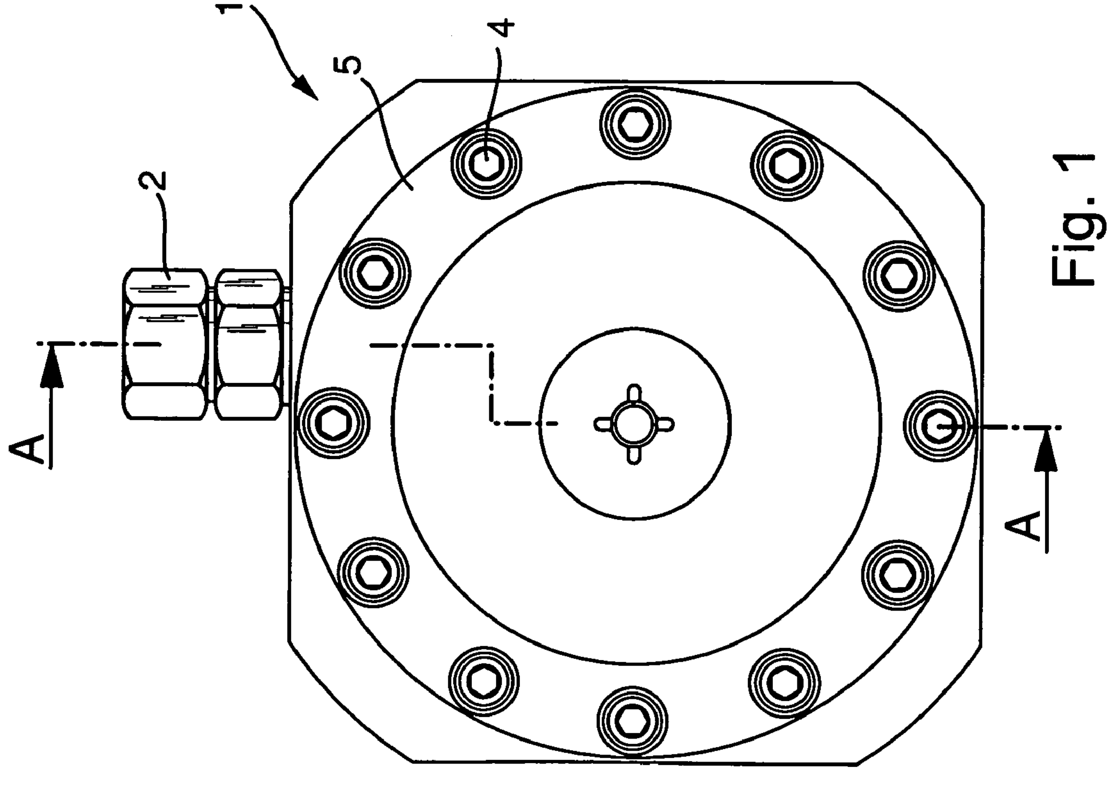
FIG. 1 is a top view of an embodiment of a pressure reservoir in accordance with the present invention.

As can be clearly seen on the basis of FIG. 1 of the drawing, hydraulic pressure reservoir 1 in accordance with the embodiment shown has a largely rectangular configuration with rounded corners, which is only one example of such a pressure reservoir.

Figure 2:
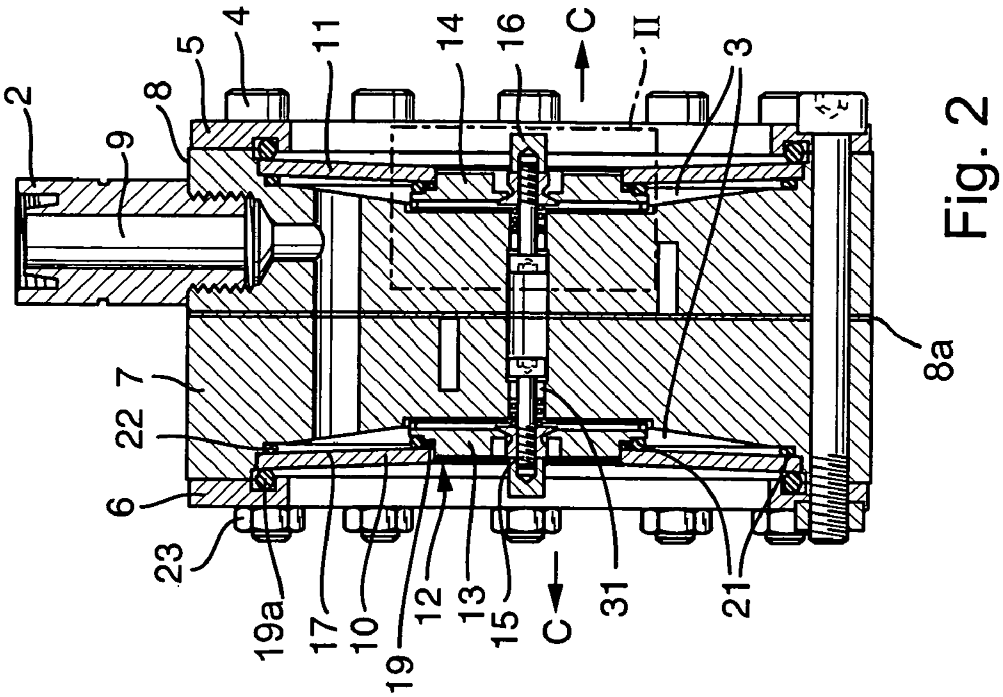
FIG. 2 is a cross-sectional view taken along the line A-A of FIG. 1.

Through connection 2, pressure reservoir 1 can be linked into a hydraulic circuit, so that the pressure fluid can be brought through connection 2 into pressure chambers 3, which can be seen in more detail in FIG. 2, and can also be released from the pressure chambers through connection 2. FIG. 1 also shows a number of threaded bolts 4 spaced at equal intervals, with which the two fixed partitions in the form of control plates 7, 8 (the embodiment of the pressure reservoir shown in the drawing is an embodiment with two pressure chambers 3) can be bolted together through the flange rings 5, 6.

Connection 2 has a passageway 9 for supplying pressure chambers 3 with fluid. As can be seen in FIG. 2, passageway 9 leads into both pressure chambers 3 above through control plate 7 and through control plate 8, respectively. The two pressure chambers 3 are axially bounded on one side by control plate 7 or control plate 8, and on the other side by diaphragm springs 10 or 11. A center opening 12 of each of diaphragm springs 10, 11 is closed by a respective inner cover 13, 14, in each of which a pressure limiting valve 15, 16 is placed.

An intermediate plate **8*a* can be positioned between the opposed faces of control plates 7, 8. The intermediate plate has bores that are positioned to correspond with bores in control plates 7, 8 to provide a fluid connection between predetermined passageways of the adjacent control plates, so that the pressure fluid in the two pressure chambers 3 is connected with the hydraulic circuit through only one flange connection 2** provided on a control plate, and the hydraulic fluid can reach both pressure chambers and can be released from them through the control plate bores and through the bores in the intermediate plate to that one flange connection.

The diaphragm spring 10 lies with its radially inwardly-lying region of the diaphragm spring body 17 against a wire ring 19 positioned in a U-shaped groove 18 (see FIG. 3), so that radially inwardly-lying contact surface 20 of the diaphragm spring body 17 can undergo a radial displacement movement on wire ring 19. As can be seen in more detail in FIG. 3 of the drawing, positioned between inner cover 14 and diaphragm spring body 17 is a sealing element 21 in the form of an elastomeric seal having a circular cross section.

In a similar manner, and referring again to FIG. 2, a wire ring **19*a* is positioned on the radially-outwardly-lying region of diaphragm spring 10, 11 in a U-shaped groove formed in flange ring 5, 6, so that the radially-outwardly-lying region of diaphragm spring body 17** can undergo a radial displacement movement at that outer location.

A sealing element 22 in the form of an elastomeric seal having a circular cross section seals off the pressure chambers 3 in the radially-outwardly-lying region. When a pressure fluid is introduced into pressure chambers 3 through connection 2 and placed under pressure, the result is an outward pressure against diaphragm springs 10, 11, so that the latter undergo movement relative to control plates 7, 8 in the direction of the arrows C in FIG. 2. When the hydraulic fluid that is present under pressure in the pressure chambers is to be released, for example to quickly raise the operating pressure in the hydraulic circuit, connection 2 can be opened by means of a valve (not shown) and the pressure fluid in pressure chambers 3 can pressurize the hydraulic circuit. At the same time, diaphragm springs 10, 11 undergo a motion opposite to the direction shown by arrows C.

By means of the threaded bolts 4 and the nuts 23, the two control plates 7, 8 are pressed so firmly against each other that they are not subjected to bending loads as the pressure builds up in the pressure chambers 3.

Figure 3:
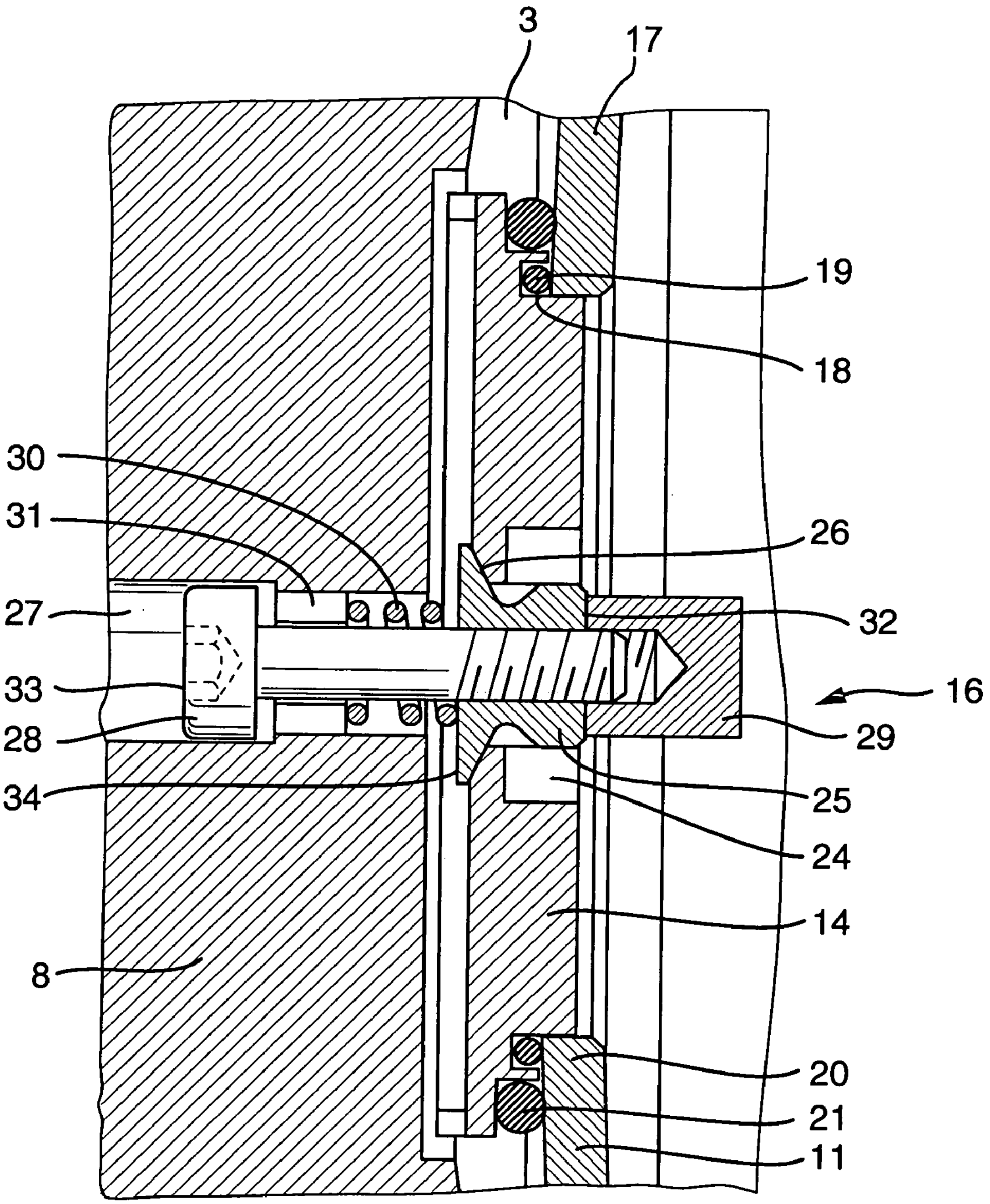
FIG. 3 is an enlarged, detailed view of the portion of FIG. 2 shown within dashed lines 11.

The construction and functioning of the pressure limiting valve 16 (pressure limiting valve 15 is analogous in its construction and manner of operation) will now be explained on the basis of Detail II of FIG. 2, shown in enlarged form in FIG. 3.

Pressure limiting valve 16 extends through a throughbore 24 in the inner cover 14, and a valve body 25 is positioned in the region of throughbore 24.

Valve body 25 has a conically-shaped sealing surface 26, that acts together with a correspondingly tapered surface of the inner cover 14 in the region of the throughbore 24. Pressure limiting valve 16 includes a threaded bolt 28 positioned in a bore 27 of control plate 8, valve body 25, and a nut 29 having a blind bore, and is held in a closed position by means of a pressure spring 30 when the pressure chamber 3 is not under load, the pressure spring 30 being supported on a shoulder 31 formed in the bore 27 of control plate 8. Between nut 29 and valve body 25 a sealing surface 32 is formed, through which pressure fluid cannot escape from the pressure chamber because screwing the nut 29 and the valve body 25 on the threads of the threaded bolt 28 between the top side of the valve body 25 and the underside of the nut 29 forms a sealing surface 32 that seals off the applied pressure force.

If the pressure in pressure chamber 3 rises, diaphragm spring 11 undergoes movement in the direction of the arrow C (see FIG. 2) and carries with it inner cover 14 and the pressure limiting valve 16. If the pressure in pressure chamber 3 rises above a predetermined threshold value, further movement of diaphragm spring 11 results in the head 33 of threaded bolt 28 contacting the shoulder 31 of control plate 8, which stops further outward movement of bolt 28. Valve body 25 then remains stationary, and inner cover 14 moves out of sealing contact at sealing surface 26. A gap opens and pressure fluid is able to escape via the throughbore 24 until the internal pressure in pressure chamber 3 has dropped far enough so that diaphragm spring 11 undergoes movement in a direction opposite to that indicated by arrow C as shown in FIG. 2, and the valve body 25, which is subject to fluid pressure over its inner face 34 by the pressure fluid in pressure chamber 3, again assumes a sealing contact with inner cover 14.

The hydraulic pressure reservoir in accordance with the invention is distinguished by the fact that the problem of a leaking membrane has been effectively eliminated, and a high number of load changes on the diaphragm springs 10, 11 does not result in leakage from pressure chamber 3. Thus, expensive mechanical production steps, such as in the precise fitting and production of piston/cylinder units for piston pressure accumulators, are eliminated.

With regard to features not explained in greater detail above, reference is made to the claims and the drawing.

Although particular embodiments of the present invention include been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic pressure reservoir for accumulating hydraulic pressure, said hydraulic pressure reservoir comprising: at least one pressure chamber for retaining a predetermined hydraulic fluid pressure for subsequent release and having a fluid connection with an external hydraulic circuit, wherein the at least one pressure chamber is formed between a movable partition and a fixed partition positioned in a housing; a pressure limiting valve operatively connected with the at feast one pressure chamber; wherein the movable partition is formed by a diaphragm spring; wherein the fixed partition is in the form of a control plate having predetermined passageways for providing a fluid connection of the at least one pressure chamber with the external hydraulic circuit, and a flange ring is connected to an outwardly-facing flange surface of the control plate for releasably securing the diaphragm spring relative to the control plate; and wherein the flange ring includes an annular recess having a U-shaped cross section on a side of the flange ring facing the at least one pressure chamber, and a wire ring positioned between the diaphragm spring and the U-shaped shaped recess; and wherein upon deflection of the diaphragm spring a radially-outwardly-lying region of the diaphragm springs undergoes a radial movement relative to the flange ring.

2. A hydraulic pressure reservoir in accordance with claim 1, wherein the diaphragm spring includes a ring-disk-shaped diaphragm spring body with a center opening, and an inner cover carried within the center opening to close the pressure chamber off from the outside.

3. A hydraulic pressure reservoir in accordance claim 2, wherein the inner cover includes an annular recess having a U-shaped cross section on a surface facing the diaphragm spring, and a wire ring is positioned between the diaphragm spring and the U-shaped recess, wherein upon deflection of the diaphragm spring a radially-inwardly-lying region of the diaphragm spring undergoes a radial movement relative to the inner cover.

4. A hydraulic pressure reservoir in accordance with claim 2, including a first sealing element positioned between the inner cover and the diaphragm spring, and a second sealing element positioned between the diaphragm spring and the control plate.

5. A hydraulic pressure reservoir in accordance with claim 2, wherein the inner cover includes a throughbore in which the pressure limiting valve is positioned.

6. A hydraulic pressure reservoir in accordance with claim 5, wherein the pressure limiting valve includes a valve body having a conically-shaped sealing surface facing the inner cover, and a threaded bolt carried in a threaded throughbore of the valve body.

7. A hydraulic pressure reservoir in accordance with claim 6, wherein the valve body is secured in position on the threaded bolt by a lock nut, and a searing surface is provided between the lock nut and the valve body.

8. A hydraulic pressure reservoir in accordance with claim 1, wherein the control plate includes a bore for receiving components of the pressure limiting valve.

9. A hydraulic pressure reservoir in accordance with claim 8, wherein a shoulder is provided within the control plate bore against which a head of the threaded bolt comes to rest upon an increase in pressure within the at least one pressure chamber above a threshold pressure value, to move the diaphragm spring away from and to open the pressure limiting valve.

10. A hydraulic pressure reservoir in accordance with claim 1 and including two pressure chambers with adjacent fixed partitions and only one fluid connection to the external hydraulic circuit, wherein the two pressure chambers are connected so that pressure forces exerted on the respective fixed partitions are mutually offset at a fixed partition contact plane.

11. A hydraulic pressure reservoir in accordance with claim 10, including an intermediate plate positioned between the fixed partitions, wherein the intermediate plate includes bores for providing fluid connection of predetermined passageways of the fixed partitions.

12. A hydraulic pressure reservoir in accordance with claim 10, wherein the fixed partitions are connected by means of threaded bolts that pass through respective flange surfaces and respective flange rings.

* * * * *